Figures 1, 2:
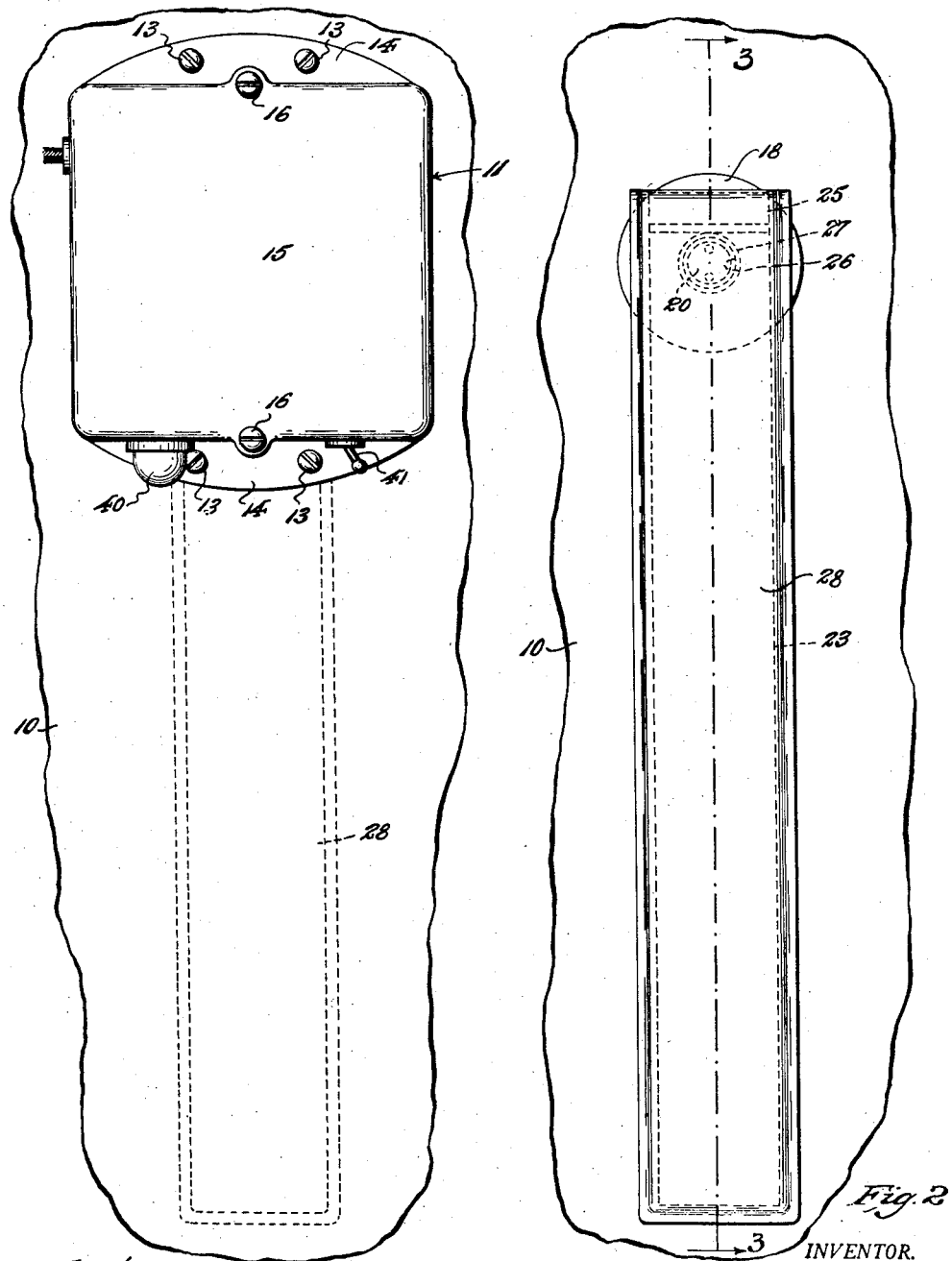

March 11, 1958     W. C. CONKLING     2,826,654
MATERIAL LEVEL CONTROL MEANS FOR BINS AND THE LIKE
Filed Feb. 10, 1956     3 Sheets-Sheet 1

INVENTOR.
William C. Conkling,
BY Richards & Cifelli,
Attorneys

March 11, 1958 W. C. CONKLING 2,826,654
MATERIAL LEVEL CONTROL MEANS FOR BINS AND THE LIKE
Filed Feb. 10, 1956 3 Sheets-Sheet 2

INVENTOR.
William C. Conkling,
BY Richards and Gifelli,
Attorneys

March 11, 1958 W. C. CONKLING 2,826,654
MATERIAL LEVEL CONTROL MEANS FOR BINS AND THE LIKE
Filed Feb. 10, 1956 3 Sheets-Sheet 3

INVENTOR.
William C. Conkling,
BY Richards & Cifelli,
Attorneys

United States Patent Office 2,826,654
Patented Mar. 11, 1958

2,826,654

MATERIAL LEVEL CONTROL MEANS FOR BINS AND THE LIKE

William C. Conkling, Essex Fells, N. J.

Application February 10, 1956, Serial No. 564,687

6 Claims. (Cl. 200—61.21)

This invention relates to means for sensing the presence or absence of discrete material in bins, hoppers, chutes, conveyors or the like.

This invention has for an object to provide in connection with a bin or the like adapted to contain discrete material, such as various forms of granular or pulverulent materials, which is to be discharged therefrom for use, improved means for maintaining a desired level of material of such character within the bin or the like, either automatically by controlling means by which service of replenishment material to the bin or the like is accomplished, or by controlling means by which the material is discharged from the bin or the like, or by actuating signal means indicative of need for service of replenishment material to the bin or the like when level of the material therein becomes undesirably low, or of need for discontinuance of such replenishment service when a desired high level of the material therein is attained, all whereby an adequate volume of the material can be constantly maintained within the bin or the like.

This invention has for a further object to provide a control device for the stated purposes which comprises a housing to contain an electric control switch, said housing being adapted to be mounted on a wall of a bin or the like for disposition exteriorly thereof, but having a portion extending through said wall into the interior of the bin or the like, in connection with which portion is mounted the pivotally supported movable member of a probe structure, said member being sensitive to pressure exerted thereupon by material contained in the bin or the like, and which is operative, when moved by such pressure, to actuate said switch for signal or service equipment control. Said probe structure is of such novel form and construction that its movable member is protected against any pressure of the material content of the bin or the like which is counter to that to which it is intended to operatively respond.

Another object of this invention is to provide a control device the probe member of which comprises a flat pressure responsive movable element of suitable length and width, and a flat stationary backing element, of corresponding length and width, by which the rear face of said movable element is shielded from contact with the material content of the bin or the like, so that only its front face is operatively contacted by said material; said movable and stationary elements of the probe member being enclosed in a flexible covering jacket which prevents obstructive access therebetween of said material or dust thereof.

This invention has for a further object to provide a control device for the stated purposes, the interior of the switch containing housing of which is sealed against communication with the interior of the bin or the like with dust proofing effect, and so that the switch and electrical connections thereof are so isolated as to minimize risk of explosion or fire.

Figure 3:
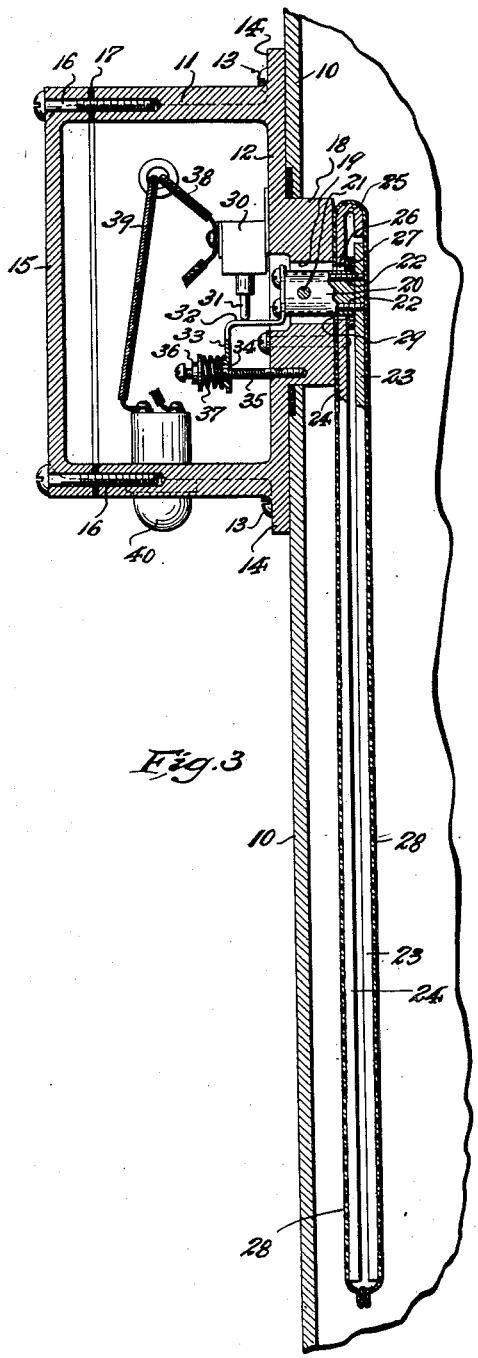

The above and other objects will become apparent upon reading the following description of illustrative embodiments of this invention in connection with the accompanying drawings, in which:

Fig. 1 is an external elevational view of one form of the control device as mounted in connection with a side wall of a bin or the like; Fig. 2 is an internal elevational view of the same; and Fig. 3 is a vertical longitudinal sectional view of the control device, taken on line 3—3 in Fig. 2.

Figure 4:
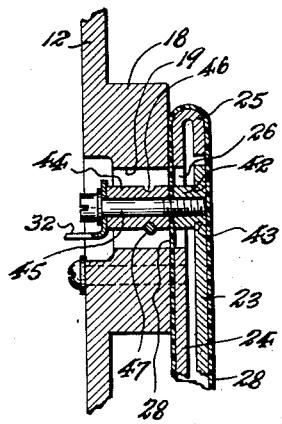
Figure 5:
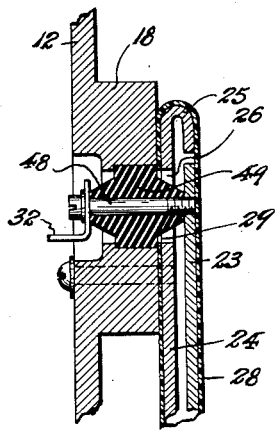

Fig. 4 is a fragmentary vertical longitudinal sectional view, showing a modified form of means by which the interior of the switch containing housing of the control device is sealed against communication with the interior of a bin or the like; and Fig. 5 is a similar view, showing another modified form of sealing means, which also serves as a pivoting fulcrum for the probe member of the control device.

Figure 6:
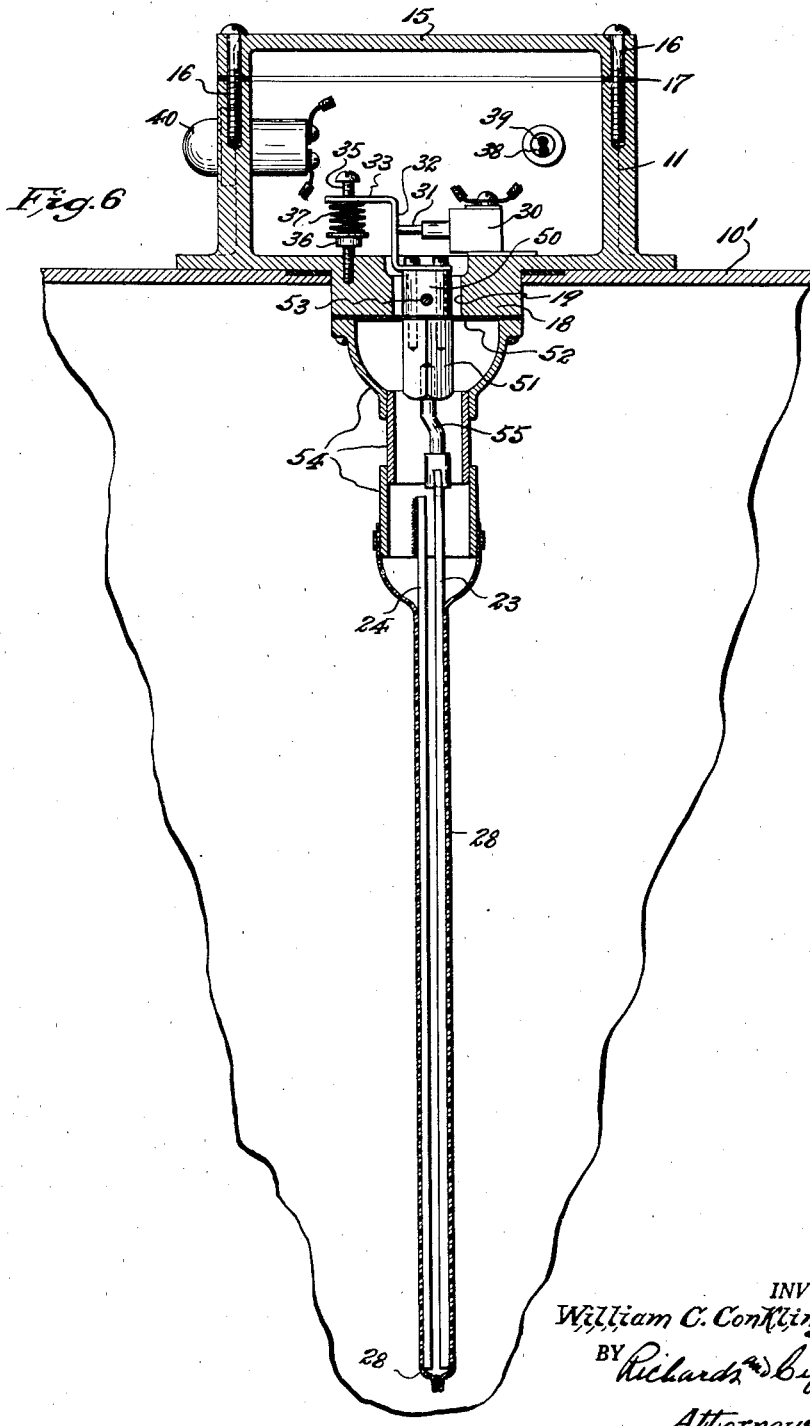

Fig. 6 is a vertical longitudinal sectional view of a modified form of the control device which is adapted to be mounted in connection with a top wall of a bin or the like.

Like characters of reference are employed in the above described views to indicate corresponding parts.

Referring first to Figs. 1 to 3 inclusive, the reference character 10 indicates a side wall of a bin or the like in connection with which the control device is mounted. The control device comprises an outwardly open housing 11 which is provided with a back wall 12 to abut the exterior face of the bin wall 10. The housing is adapted to be affixed to the bin wall, for external projection therefrom, in any suitable manner, as e. g. by fastening bolts or screws 13 which are adapted to be engaged with said bin wall through external flanges 14 which extend from said housing. The outer open end of the housing 11 is normally closed by a removable cover member 15, which is secured thereto by fastening screws 16, and which is preferably sealed thereto by an interposed gasket 17. Projecting from the back wall 12 of the housing 11 is a boss 18 which extends through the bin wall 10 into the bin interior, and which is provided with an axial bore 19.

Extending axially through the bore 19 of the housing boss 18 is a lever arm 20, which is of less diameter than the diameter of said bore. This lever arm is supported by a transverse horizontal pivot pin 21 which extends through and across the housing boss 18, thus mounting said lever arm for oscillatory movement in a vertical plane. Affixed to the inner end of the lever arm 20, which projects exteriorly from the bore 19 of the housing boss 18, e. g. by fastening screws 22 which extend longitudinally through said lever arm, is a flat probe member 23 of suitable length and width. Said probe member 23 depends from the lever arm within the interior of the bin, and its outer face is subject to contact by the material content of the bin, so that it can swing inwardly about the pivot of the lever arm as a fulcrum in response to pressure exerted thereupon by said material content of the bin. Said probe member 23 being unitary with said lever arm 20, is adapted, when moved by pressure of the material content of the bin, to impart tilting movement to said lever arm about its pivot pin 21. Affixed to the end face of the housing boss 18, behind the probe member 23 in suitably spaced apart relation thereto, is a stationary flat probe shielding member 24, the lower end portion of which is coextensive with and corresponds in width to said probe member 23. The upper end portion of the probe shielding member 24 extends upwardly beyond the upper end of the probe member 23, and is doubled upon itself, as at 25, so as to overhang the latter. Said probe shielding member 24 is provided with an opening 26 which is axially aligned with the bore 19 of the housing boss 18, and through which the inner end portion of the lever arm 20 extends to the probe member 23. The movable probe member 23, being backed by said probe shielding member 24, presents but one face thereof to pressure contact of the material content of the bin, and consequently can be moved by such pressure only in a direction which tilts the lever arm 20 for actuation of an electrical control switch subsequently herein described. Any pressure of the material counter to that to which the probe member 23 is intended to respond is interrupted by the probe shielding member 24. By reason of this, unobstructed operative response of the movable probe member 23 to bin material pressure is assured.

Means is provided for sealing off the interior of the bin from communication with the interior of the housing 11. One form of means for this purpose, as shown in Fig. 3, comprises a resilient sealing member 27 which is mounted around the lever arm 20 between the probe member 23 and the probe shielding member 24, so as to cover and close the opening 26 of the latter and thus the bore 19 of the housing boss 18. Said sealing member 27 may suitably comprise felt, rubber or like resilient material which will readily yield to operative movement of the probe member 23.

Means is provided to bar entrance of material from the bin content, or dust therefrom, between the probe member 23 and the probe shielding member 24 which, if permitted, might fill the space between these members, and thereby obstruct operative movement of the probe member. Means for this purpose comprises a hollow closed jacket member 28 made of a suitable flexible sheet material. This jacket member is disposed to entirely envelop said probe and probe shielding members, and, being flexible, offers no obstruction or resistance to pressure contact of the material content of the bin for operative effect upon the probe member 23. The back face portion of said jacket member 28 is interposed between the probe shielding member 24 and the end face of the housing boss 18 to which said member is affixed, and is provided with an opening 29 to pass the lever arm 20 to its connection with the probe member 23.

Mounted within the housing 11, upon the back wall 12 thereof, and adjacent to the bore 19 of the housing boss 18, is an electrical switch 30 of suitable type. Projecting from the switch 30 is a switch operating push piece 31, which is disposed perpendicular to the axis of said bore 19 of the housing boss 18.

Affixed to the outer end of the lever arm 20, so as to be unitary therewith, is an outwardly projecting switch actuator member 32, which is disposed parallel to the axis of said lever arm, and so as to underlie and engage the switch operating push piece 31. This switch actuator member 32 terminates at its outer end in a dependent angular extension 33, which is provided, adjacent to its free end, with an opening or slot 34. Extending through said opening or slot 34, to screw into the housing boss 18 so as to be fixedly supported thereby, is a carrier screw 35. Adjustably mounted on said carrier screw 35 is a stop nut 36, and interposed between the latter and said extension 33 is a compression spring 37. The tensional thrust of said spring 37 against the extension 33 can be regulated by adjusting the spacing of the stop nut 36 relative to said extension 33.

When arranged, as shown in Fig. 3, the compression spring bears against the outer face of the extension 33, whereby it will be compressed by clockwise rotation of the lever arm 20 and extension 33 induced by in swinging movement of the probe member 23, when the latter is subjected to pressure contact of the material content of the bin, so that the tensional thrust of said compression spring 37 will return these parts to normal initial positions when such pressure against the probe member is relieved.

The switch 30 is preferably of a self-opening type well known to the art, wherein its contact members are normally separated by spring means (not shown). The above described relation of the spring 37 to the extension 33 is preferable in cases wherein the tension of the switch contained spring is not sufficiently strong to assure return movement of the lever arm 20 and probe member 23 after operation. However, in cases wherein the switch contained spring is sufficiently strong to also return the lever arm 20 and probe member 23 to their normal initial positions after operation, the compression spring 37 can be disposed to bear against the inner face of the extension 33 in counterbalancing relation to the switch contained spring, and thus assuring constant engagement of said extension 33 with the switch operating push piece 31. This latter arrangement is shown in Fig. 6.

The switch 30 is connected to a source of electrical current by circuit wires 38 and 39, which enter the housing 11. In practice, the switch 30 is connected in series with a signal lamp or with material control equipment by which the bin is served, or both, and the circuit may also include a suitable manual switch operative to put the control device in and out of service. As shown, a signal lamp 40 can be mounted in connection with a wall of the housing 11, and, similarly, a manual switch 41 can also be mounted in connection with a wall of the housing 11, if so desired.

Referring to Figs. 4 and 5, alternate means are shown therein for sealing off the interior of the bin from communication with the interior of the housing 11.

In Fig. 4, a portion of the back wall of the jacket member 28 is utilized for sealing purposes. In such arrangement, the lever arm which carried the probe member 23 is modified to comprise two parts, viz. an inner part 42, which is affixed by a riveted connection 43 to the probe member 23, and an outer part 44. The back wall of the jacket member 28 is engaged between said inner and outer parts 42 and 44, and is clamped therebetween by a clamp screw 45, which also serves to affix the extension 32 to the outer end of this form of lever arm. It will be obvious that, as thus disposed, a back wall portion of the jacket member 28 closes over the bore 19 of the housing boss 18, thus sealing off the interior of the housing from the interior of the bin. Said modified form of lever arm is pivotally supported by an annular bearing groove 46 which engages a horizontal transverse pivot pin 47 that is mounted across the housing boss 18.

In Fig. 5, the lever arm which carries the probe member 23 comprises a bolt 48 which extends axially through a resilient body 49 of rubber or similar elastic material, which body is affixed across the bore 19 of the housing boss 18. By reason of its elasticity or resilience, said body 49 yields to operative tilting movement of the bolt 48, while at the same time said body serves as a sealing means between the bin interior and the interior of the housing 11.

It will be understood that the control device, in the form thereof shown in Fig. 3 and above described, can be mounted in connection with a bin side wall in any desired position intermediate the top and bottom of the bin, whereby to be actuated by the material content of the bin, when said content rises to a level at which it operatively engages the probe member 23.

It is often desirable to mount a control device in connection with the top wall 10' of a bin, with the probe member 23 thereof dependent within the upper region of the bin. In Fig. 6 is shown a form of the control device which is modified to accommodate it to such location. As modified to this end, the housing 11 and its contained elements are substantially the same as hereinabove already described, but the connection of the probe elements has been altered to dispose the same in axial instead of angular extension from the lever arm. The lever arm is of the two part type, comprising an outer part 50 and an inner part 51, which are fastened together end to end with a sealing diaphragm 52 engaged therebetween. The lever arm is pivotally supported by a horizontal transverse pivot pin 53 which is mounted across the housing boss 18, to engage through the outer part 50 of the lever arm. The sealing diaphragm is clamped between the housing boss 18 and an axially dependent casing structure 54 that is affixed to said housing boss. The inner part 51 of the lever arm extends into said casing structure, and connected thereto by a coupling means 55 is the probe member 23. The probe shielding member 24 is affixed, as by welding, to the lower end portion of the casing structure 54, so as to extend in parallelly spaced relation to the probe member 23. The jacket member 28 is disposed in enveloping relation to the probe and probe shielding members, with its upper end suitably affixed to the lower end portion of said casing structure so as to depend therefrom.

It will be understood that a control device of the form shown in Fig. 6 can be disposed at the top of the bin, and arranged to stop supply of replenishment material to the bin when the latter is filled, and cooperative therewith a control device of the form shown in Fig. 3 can be disposed adjacent the bottom of the bin, and arranged to cause supply of replenishment material to the bin, when refilling of the latter is required.

It may be here pointed out that under circumstances wherein gaseous pressure is likely to exist in the bin interior, e. g. when material is supplied to the bin by pneumatic conveyor means, it is desirable that the jacket member 28 be of such character or so constructed that communication between its interior and the bin interior is permitted, so that gaseous pressure within the jacket member is in balance with that in the bin interior. This may be assured if the sheet material of the jacket member is of somewhat porous character, or openings (not shown) are provided therein so disposed that the material content of the bin can not enter therethrough to gain access to the space between the movable probe member 23 and the probe shielding member 24.

From the above description of the instant invention it is believed that the use and operation thereof will be readily understood by those skilled in the art. It will also be apparent that various changes can be made in the detail construction and relation of the elements comprising the control device of this invention, and consequently limitation of the invention to the exact construction and relation of said elements is not intended except as required by the scope of the following claims.

Having now described my invention, I claim:

1. Material level control means for a bin or the like comprising a housing containing an electrical control switch, said housing being adapted to be mounted in a wall of the bin, an oscillatable lever supported by the housing and operative to actuate said switch, a movable probe member affixed to said lever within the bin and adapted to be moved by pressure of material in said bin which is exercised in direction to operate said lever for switch actuation, and a rigid stationary shielding member coextensive with and supported behind said movable probe member in parallel plane adjacently spaced relation thereto, whereby to shield the latter against pressure of the material content of the bin in counter direction.

2. Material level control means for a bin or the like according to claim 1, including a jacket member of flexible material enveloping said probe and probe shielding members.

3. Material level control means for a bin or the like comprising a housing adapted to be mounted on the exterior face of a bin wall and having a boss projecting through said wall, said boss having an axial bore, an oscillatable lever supported by said boss for extension through said bore into the bin interior, a flat movable probe member of selected length and width affixed to said lever within the bin and adapted to be moved by pressure of material in said bin which is exercised in direction to impart operative movement to said lever, a rigid flat stationary probe shielding member of length and width substantially corresponding to the length and width of said probe member and supported behind the latter in parallel plane adjacently spaced relation thereto, whereby to shield the latter against pressure of the material content of the bin in counter direction, and an electrical control switch in said housing adapted to be actuated by probe member induced movement of said lever.

4. Material level control means for a bin or the like according to claim 3, including sealing means cooperative with said bore to close communication between the interior of the bin and the housing interior.

5. Material level control means for a bin or the like according to claim 3, including a jacket member of flexible material enveloping said probe and probe shielding members.

6. Material level control means for a bin or the like according to claim 5, including sealing means cooperative with said bore to close communication between the interior of the bin and the housing interior.

References Cited in the file of this patent

UNITED STATES PATENTS

| | | |
|---|---|---|
| 1,298,950 | Hull | Apr. 1, 1919 |
| 2,611,044 | Siemon | Sept. 16, 1952 |